Patented May 18, 1926.

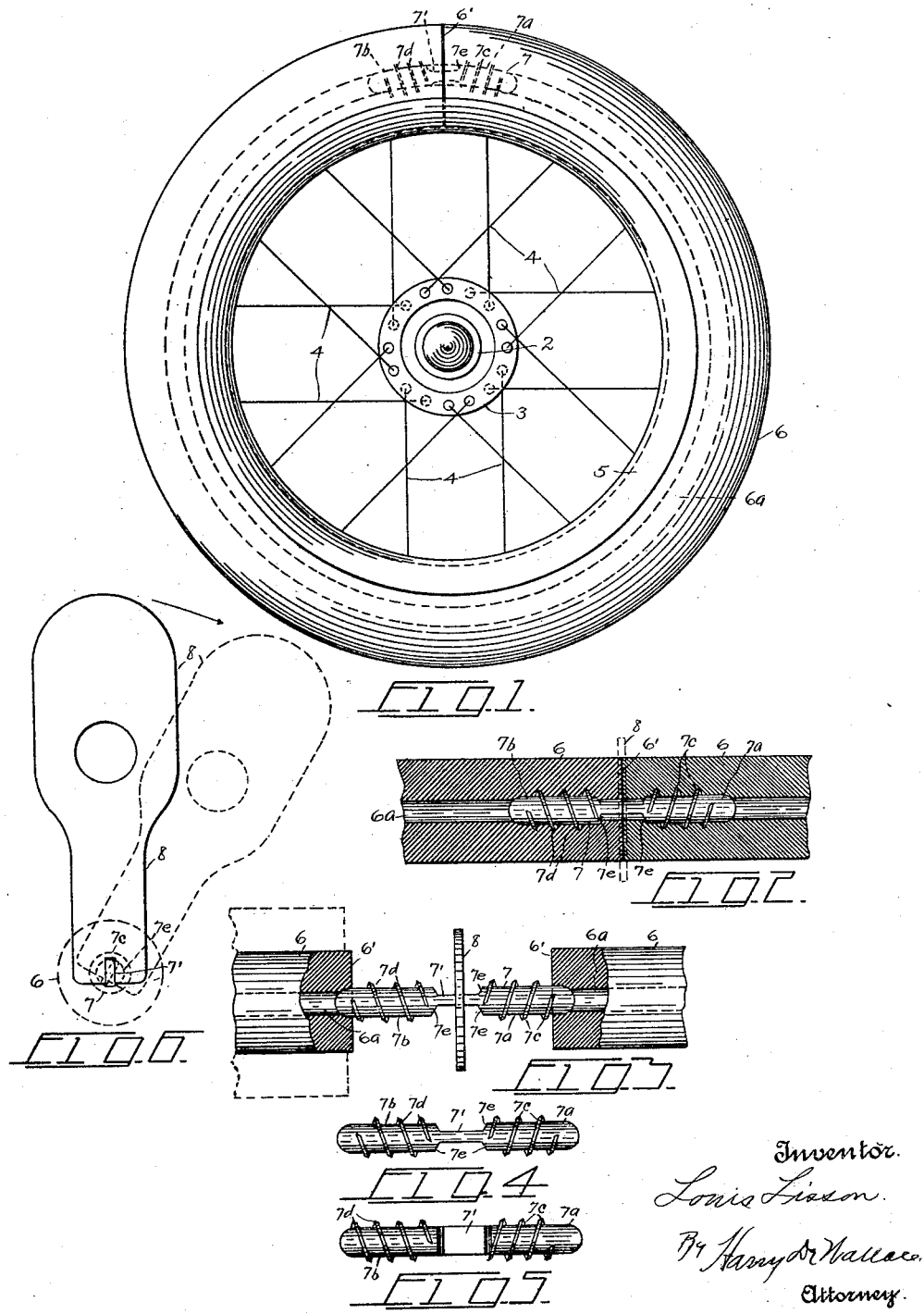

1,585,590

UNITED STATES PATENT OFFICE.

LOUIS LISSON, OF SYRACUSE, NEW YORK.

TIRE COUPLING.

Application filed October 16, 1925. Serial No. 62,838.

This invention relates to improvements in rubber tires, designed particularly for attachment to the wheels of baby-carriages, go-carts, velocipedes, and like small vehicles, and has for its primary object to provide novel, simple and effective means for coupling the ends of split non-pneumatic tires, the said coupling being especially adapted for repairing and renewing the ordinary solid cushion tires. A further object is to provide a coupling, which consists of a solid cylindrical body having its medial portion flattened for facilitating the use of a wrench by means of which the coupling may be applied and removed, as well as for dividing the body into substantially equal portions, which are forcibly inserted into the facing ends of the tire; the said flattened portion being of a thickness to enable the coupling to flex and to conform to the curvature of the tire, and the round portions of the body beyond said flattened portion being provided respectively with right and left hand threads, which may be screwed into the opposing ends of the tire simultaneously by the manipulation of the wrench in the proper direction, for drawing and holding said ends tightly together.

This invention relates particularly to improvements in the tire coupling shown and described in my United States Patent No. 1,530,837, dated March 24, 1925.

The various features and parts of the invention will be understood from the detailed description which follows, and by reference to the accompanying drawing, in which—

Figure 1 is a side elevation of one type of vehicle wheel in common use, to which my improved coupling is applied. Fig. 2 is a central longitudinal section through the split portion of the tire; showing the coupling fully applied; the dotted lines showing the wrench embedded in the spongy rubber at the final closing of the gap in the tire. Fig. 3 is a view, partially in elevation and partially in section, of the split portion of the tire, the ends thereof being spread apart; the plain free ends of the coupling entered into the small bore of the tire, and the wrench engaging the reduced medial portion, ready to start the screwing operation. Figs. 4 and 5 are respectively an edge and a plan view of the coupling. And Fig. 6 is an enlarged plan view of the wrench, in which the dotted lines show its application to the coupling and the direction the wrench is turned for applying the coupling.

In the drawing, 2 represents the hub of the wheel, 3 the spoke flange, and 4 the wire spokes which support the usual metal rim, the latter being provided with the usual semi-circular circumferential groove to receive a round cushion tire, as 6. Tires of the class herein shown, especially for repairs and renewals are usually made from continuous lengths of round cushion rubber and are therefore split, as at 6', and require some means for coupling the free ends before the tires are applied to the wheel rims. The material for the tire 6 is usually cut from 10% to 12% shorter than the circumferential measurement of the rim 5, and being more or less elastic, the coupled tire is usually expanded and sprung into the groove of the rim, in a well-known manner. Some of the tire stock is molded solid, but the preferred variety is usually formed with a relatively small caliber bore, as $6^a$, shown in Figs. 1, 2 and 3.

7 represents my improved coupling, which comprises an elongated substantially cylindrical body, having its medial portion flattened, as at 7', which divides the body into similar end portions, as $7^a$—$7^b$, and is designed particularly for facilitating the use of a wrench, as 8, for applying and removing the coupling from the tire, as shown in Figs. 2, 3 and 6. The opposite round end portions of the coupling are threaded, as at $7^c$ and $7^d$, the said threads winding respectively in opposite directions away from the flat portion 7', the threads being preferably right and left hand, for enabling the coupling to be screwed into the opposite ends of the tire simultaneously to the same extent, by means of the wrench 8, as shown in Figs. 3 and 6. The threads $7^c$—$7^d$ are usually of the same pitch, and preferably start near the medial flat portion 7', and terminate some distance from the free ends of the body, the latter being preferably clear and smooth, for facilitating the ready insertion of said ends into the somewhat contracted bore $6^a$ of the tire, as shown in Fig. 3.

To start the coupling operation, one end of the tire is preferably placed between the jaws of an ordinary vise (see Fig. 3) and one end of the coupling is next inserted in the bore $6^a$, the coupling being held in line with the bore while the operator coils the tire and inserts the opposite end of the coupling into the free end of the tire (see Fig. 3). The tire and coupling are then firmly held in the latter position while the wrench 8 is being applied and swung in the direction for simultaneously screwing the threaded portions 7°—7ᵈ into the ends of the tire, until the gap in the tire is entirely closed, as shown in Figs. 1 and 2. The bore 6ᵃ being smaller in diameter than the body portions 7ᵃ—7ᵇ, contracts again substantially to its normal size immediately the shoulders 7ᵉ, at the opposite ends of the flat portion 7′ pass beyond the planes of the ends of the tire, and forms abutments, which tend to resist the subsequent loosening and spreading of the ends when the tire is afterwards expanded and sprung into the groove of the rim. The same action takes place with respect to the threads 7°—7ᵈ. During the installing of the coupling these threads compress or displace the rubber walls of the bore 6ᵃ sufficiently to form spiral paths while the coupling worms its way into the tire, and at the end of the coupling operation, the rubber of the opposite ends that lies between the facing terminals of the threads 7°—7ᵈ contracts and crowds in behind the threads, thereby creating additional resistance to the freeing of the coupling accidentally, either during the applying or wearing stages.

In my former patent, the coupling comprises a rigid elongated body, which when screwed into the ends of the tire, assumes a position substantially tangent to the axis of the tire, and tends to flatten the tire in the vicinity of the joint, to an extent that is not only unsightly, but causes the wheel to pound or knock and jar the vehicle when the latter is in motion. In the present case, by flattening the medial portion of the coupling, to an extent that renders said portion somewhat flexible the coupling when finally applied (see Figs. 1 and 2) with its narrow edges facing laterally, the said portion flexes and the coupling readily conforms to the curvature of the tire and prevents distortion of the tread of the wheel. This particular disposition of the coupling may be readily and accurately effected at the end of the coupling operation, by the operator stopping and withdrawing the wrench 8 when the latter is finally brought to the position shown in Figs. 2 and 3. Furthermore, by leaving the coupling in the position shown in Figs. 1 and 2, the tire may be uncoupled in a ready manner, by simply forcing the jaws of the wrench between the ends of the tire until they straddle the flat portion 7′. The subsequent turning of the wrench in the direction opposite to that indicated by the arrow in Fig. 6, unscrews the coupling. By eliminating the medial flange of my former coupling and substituting the flat portion 7′ herein shown, the ends of the tire may be drawn tightly together without any interference, and by reason of the expansion of the portions of the rubber that become temporarily displaced by the cylindrical portions of the coupling and the threads 7°—7ᵈ, as explained, there is no danger of the joint of the tire spreading or gaping.

Having thus described my invention, what I claim, is—

1. A unitary coupling for split cushion tires comprising an elongated body having spaced portions separated by a relatively thin flattened medial portion, said portion adapted to flex for enabling the coupling to conform to the curvature of the tire, the said spaced portions being formed respectively with oppositely winding threads whereby the body may be screwed simultaneously into the opposing ends of the tire, and said flat portion adapted to be gripped by a wrench by which the applying and removing of the coupling is effected.

2. A coupling for split cushion tires including a substantially cylindrical body having ends connected by a central flexible portion of such degree of flexibility as to enable the coupling to conform to the curvature of the tire, and projections on the ends of the body formed to engage within the tire.

3. A coupling for split cushion tires including a body having substantially cylindrical ends connected by a central flexible portion of such degree of flexibility as to enable the coupling to conform to the curvature of the tire, and projections on the ends of the body formed to engage within the tire, the flexible portion being of substantially uniform cross-section throughout so as to permit the ends of the tire to directly abut each other throughout the extent of the tire ends, and at points in register with the flexible portion.

In testimony whereof I affix my signature.

LOUIS LISSON.